(12) United States Patent
Lin et al.

(10) Patent No.: US 6,969,930 B2
(45) Date of Patent: Nov. 29, 2005

(54) HALF-STEPPING MOTOR WITH BIFILAR WINDING RATIO FOR SMOOTH MOTION

(76) Inventors: Ted T. Lin, 12307 Crayside La., Saratoga, CA (US) 95070; Ryan C. Lin, 12307 Crayside La., Saratoga, CA (US) 95070

( * ) Notice: Subject to any disclaimer, the term of this patent is extended or adjusted under 35 U.S.C. 154(b) by 0 days.

(21) Appl. No.: 10/902,192

(22) Filed: Jul. 28, 2004

(65) Prior Publication Data

US 2005/0242671 A1    Nov. 3, 2005

Related U.S. Application Data (60) Provisional application No. 60/566,981, filed on Apr. 29, 2004.

(51) Int. Cl.[7] .................. H02K 37/02; H02K 37/14; H02P 8/00
(52) U.S. Cl. .............. 310/49 R; 310/180; 310/184; 318/696
(58) Field of Search ............... 310/49 R, 180, 310/184; 318/254, 685, 696

(56) References Cited

U.S. PATENT DOCUMENTS

| | | | |
|---|---|---|---|
| 3,466,518 A | 9/1969 | Aylikci et al. | 318/138 |
| 4,423,343 A | 12/1983 | Field, II | 310/49 R |
| 4,584,512 A | 4/1986 | Pritchard | 318/696 |
| 4,623,828 A | 11/1986 | Schmitz | 318/696 |
| 4,629,916 A | 12/1986 | Oudet | 310/49 R |
| 4,634,906 A | 1/1987 | Grosjean | 310/49 R |
| 4,634,948 A | 1/1987 | Brigham | 318/696 |
| 4,634,949 A | 1/1987 | Golladay | 318/696 |
| 4,638,195 A | 1/1987 | Lin | 310/49 R |
| 4,647,802 A | 3/1987 | Konecny | 310/49 R |
| 4,675,564 A | 6/1987 | Isozaki | 310/49 R |
| 4,739,201 A | 4/1988 | Brigham et al. | 310/49 R |
| 4,792,709 A | 12/1988 | Smith et al. | 310/49 R |
| 4,868,477 A | 9/1989 | Anderson et al. | 318/696 |
| 4,910,475 A | 3/1990 | Lin | 310/49 R |
| 4,942,345 A | 7/1990 | Horst | 318/254 |
| 5,157,298 A | 10/1992 | Kawabata | 310/156 |
| 5,270,597 A | 12/1993 | Yubazaki et al. | 310/49 R |
| 5,309,051 A | 5/1994 | Kobori | 310/49 R |
| 5,374,865 A | 12/1994 | Yoshimura et al. | 310/49 R |
| 5,406,185 A | 4/1995 | Strunk | 318/767 |
| 5,444,316 A | 8/1995 | Ohya et al. | 310/49 R |
| 5,689,167 A | 11/1997 | Vitunic | 318/767 |
| 5,694,027 A | 12/1997 | Satake et al. | 322/63 |
| 5,723,931 A * | 3/1998 | Andrey | 310/179 |
| 5,821,722 A | 10/1998 | Forbes et al. | 318/696 |
| 5,852,334 A | 12/1998 | Pengov | 310/168 |

(Continued)

*Primary Examiner*—Burton Mullins
(74) *Attorney, Agent, or Firm*—Schneck & Schneck; Thomas Schneck; Mark Protsik (57) ABSTRACT

A half-stepping motor with bifilar coil windings about its stator poles has two layers of stator coils with different numbers of turns per pole for each layer. The ratio between the number turns is selected to provide a desired angular phase shift in the torque profile. A first layer wound about a first group of poles is connected in series in a forward sense with a second layer wound about a second distinct group of poles and driven by a first phase, while a second layer wound about the first group of poles is connected in series in a reverse sense with a first layer wound about the second group of poles and driven by a second phase in quadrature relation to the first phase. For a motor with 8 stator poles, the desired phase shift is 22.5 degrees, resulting from a turn ratio between the layers of about 0.4142.

11 Claims, 5 Drawing Sheets

U.S. PATENT DOCUMENTS

| | | | |
|---|---|---|---|
| 5,889,347 A | 3/1999 | Tang et al. | 310/165 |
| 5,889,379 A | 3/1999 | Yanagi et al. | 318/696 |
| 5,977,684 A | 11/1999 | Lin | 310/268 |
| 6,008,561 A | 12/1999 | Tang | 310/183 |
| 6,060,809 A | 5/2000 | Pengov | 310/168 |
| 6,078,122 A | 6/2000 | Tang et al. | 310/165 |
| 6,104,150 A | 8/2000 | Oohara et al. | 318/254 |
| 6,114,782 A | 9/2000 | Lin et al. | 310/49 R |
| 6,597,077 B2 | 7/2003 | Lin et al. | 310/49 R |
| 6,791,226 B1 * | 9/2004 | Dhawan | 310/184 |
| 6,847,147 B2 * | 1/2005 | Gladkov | 310/179 |
| 2003/0048012 A1 | 3/2003 | Iwase et al. | 310/49 R |

* cited by examiner

ELECTRICAL PHASE DIAGRAM

HALF-STEPPING MOTOR WITH BIFILAR WINDING RATIO FOR SMOOTH MOTION

CROSS-REFERENCE TO RELATED APPLICATION

This application claims priority from U.S. provisional application No. 60/566,981, filed Apr. 29, 2004.

TECHNICAL FIELD

The present invention relates to electric motor structures designed to rotate step by step, i.e. stepper motors, and in particular to the details of the layout of or connections between the windings around a motor's stator. This invention relates especially to stepper motors that have been constructed to provide a smoother torque profile for uses wherever smooth motion or low noise may be required.

BACKGROUND ART

A variety of techniques have been devised to reduce the torque variability or ripple in stepper motors. One such technique modifies the drive current waveforms that energize the windings. For example, in U.S. Pat. No. 4,634,949 to Golladay, two groups of phase windings are driven by sinusoidal waveforms in quadrature with each other that have different first and second voltage amplitudes. Other techniques involve breaking rotational symmetry by displacing the positions or modifying the relative dimensions of one or more groups of poles. For example, U.S. Pat. No. 4,739,201 to Brigham et al. shows how one can reduce any given harmonic of the torque/angle curve by displacing a first set of rotor or stator pole teeth from their "normal" position relative to a second set by a displacement angle that has been calculated to cancel the harmonic generated by one set with that generated by the other set. U.S. Pat. Nos. 5,852,334 and 6,060,809 to Pengov employ a rotor with alternately wide and narrow pole faces. Still other techniques effectively average the magnetic field's influence on torque by having different numbers of rotor and stator poles and/or teeth with correspondingly different pitches and rotational offsets with respect to one another (cf., U.S. Pat. Nos. 4,423,343; 4,647,802; 4,675,564; 5,157,298; 5,309,051). Electronic and mechanical dampings have been used to improve the smooth motion. In U.S. Pat. No. 6,008,561 to Tang, a motor is provided with auxiliary damping windings which are coupled to form a closed current loop that absorbs energy from or provides energy to the phase windings. In U.S. Pat. Nos. 5,889,347 and 6,078,122, Tang et al. provide fractional-pitched coils that allow both self- and mutual-inductions to contribute to the torque output.

The present inventor has also contributed to the advancement of stepper motors, as exemplified in prior U.S. Pat. Nos. 4,638,195; 4,910,475; 6,114,782; and 6,597,077. In the last of these aforementioned patents ('077), Lin et al. describe a two-phase step motor with bifilar windings around the stator poles, which are connected to a two-phase driver in a manner, called a T-connection different from conventional series and parallel stator coil connections, that maximizes torque at medium speed operation. In particular, four stator coils are wound around the stator poles in a bifilar winding pattern with coils wound around different groups of stator poles are connected in series. In one set, both coils are connected in a forward sense around the stator, while in the other set the two coils are connected in opposite senses around the stator. The T-connection also smoothes stepping motion and reduces vibrations compared to the conventional parallel or series connections for stepper motors.

Traditional half-stepping allows the motor to stop alternately at one-phase ON and two-phase ON positions. The phase angles for these positions are 0°, 45°, 90°, 135°, 180°, 225°, 270°, 315°, then again back to 0°. The motor settling time characteristics are different at one-phase ON and two-phase ON. The step time profile from every controller assumes that the settling time character of each step is the same. The erratic motion occurs when the step time is not synchronous with the rotor position.

An object of the present invention is to provide an improved half-stepping motor for smoother motion and low noise.

DISCLOSURE OF THE INVENTION

The object is met by a half-stepping motor characterized by two sets or layers of windings with different numbers of turns for each layer. For a motor with 8 stator poles separated by 45°, the turn ratio between the two sets of coils is preferably close to $\tan(22.5°) \approx 0.4142$. For instance, if a first layer is wound at N1 turns, then the second layer should be wound at $N2 = 0.4142 \times N1$ turns. A total of four stator coils are wound around the stator poles in a bifilar winding pattern, with first and second coils (phase A coils) wound as a pair around a first group of every other stator pole in alternating clockwise and counterclockwise directions around each successive pole in that first group of poles, and with third and fourth coils (phase B coils) wound as another pair around a second group of every other stator pole, distinct from the first group, again in alternating clockwise and counterclockwise directions around successive poles of that second group. The first layer's phase A coil is connected in a forward sense to the second layer's phase B coil to form the new phase α. The first layer's phase B coil is connected in a reverse sense to the second layer's phase A coil to form a new phase β.

The winding arrangement in the present invention minimizes the differences in magnetic field over an entire range of the controlling phase angle. The different magnetic fluxes under one-phase ON and two-phase ON develop a step hysteresis. The winding thus effectively eliminates the one-phase ON position, and the rotor position will be at two-phase ON all the times during the half-stepping. The new invention shifts the new phase α to 22.5° from the original phase A position of 0° by winding the different turns on each layer with the turn ratio to be $\tan(22.5°)$. The phase angle for each position will then be 22.5°, 67.5°, 112.5°, 157.5°, 202.5°, 247.5°, 292.5°, 337.5°, and then back to 22.5°. This is a shift of 22.5° from the original phase A. The invention can be generalized to any turn ratio between the two layer windings other than 1:1. We can shift the torque profile by any angle x from 0° up to ±45° by choosing an appropriate turn ratio, $\tan x$.

The step response of each ½ stepping position is identical. With the same number of turns per stator pole, the phase inductance and holding torque is reduced, which can be compensated, if desired, by a proportional increase in the number turns.

This invention results in smoother motion for step motor applications. The specific applications are in printers, security cameras, x-y tables, scanners, CNC machines, dispensers, injector pumps, turntables, optical equipment, and any precision devices of motion control system.

BRIEF DESCRIPTION OF THE DRAWING

FIGS. 2A–2D show magnetic flux paths for the motor of FIGS. 1A–1C at three states of the drive phases α, αβ, and β. FIG. 2A is a schematic side sectional view of a rotor and stator, while

BEST MODE OF CARRYING OUT THE INVENTION

Figure 1A:
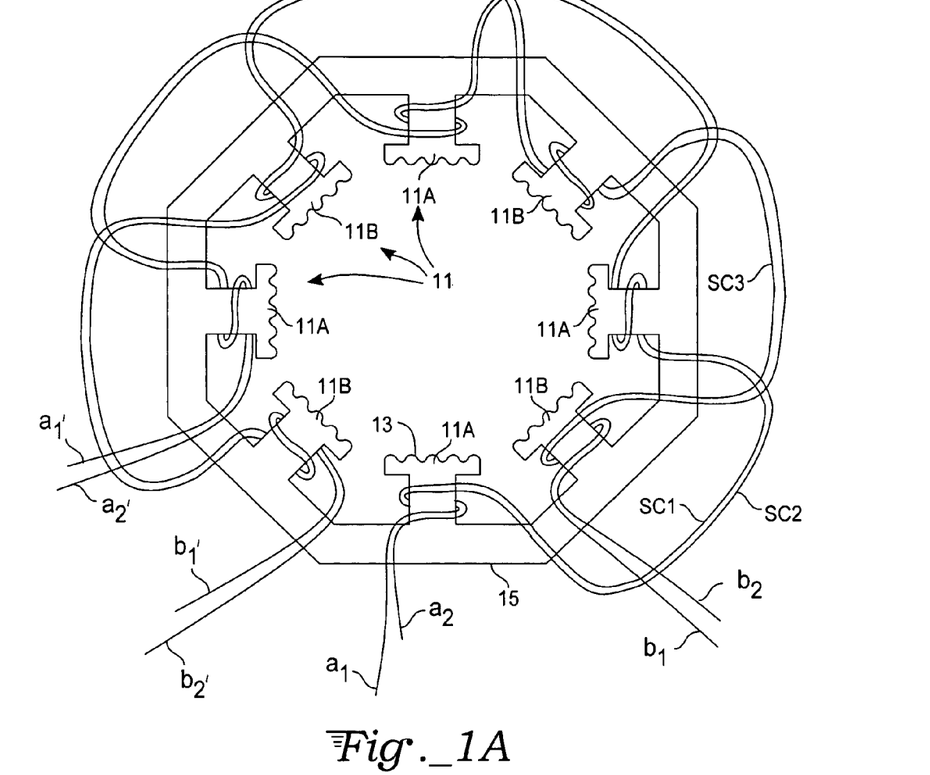
FIGS. 1A–1C are a top elevational view, a winding diagram, and an electrical connection diagram for the stator of a stepper motor in accord with the present invention. Here, an eight-pole stator with bifilar windings (in a N2/N1 turn ratio) connected to a two-phase driver is illustrated.
Figure 1B:
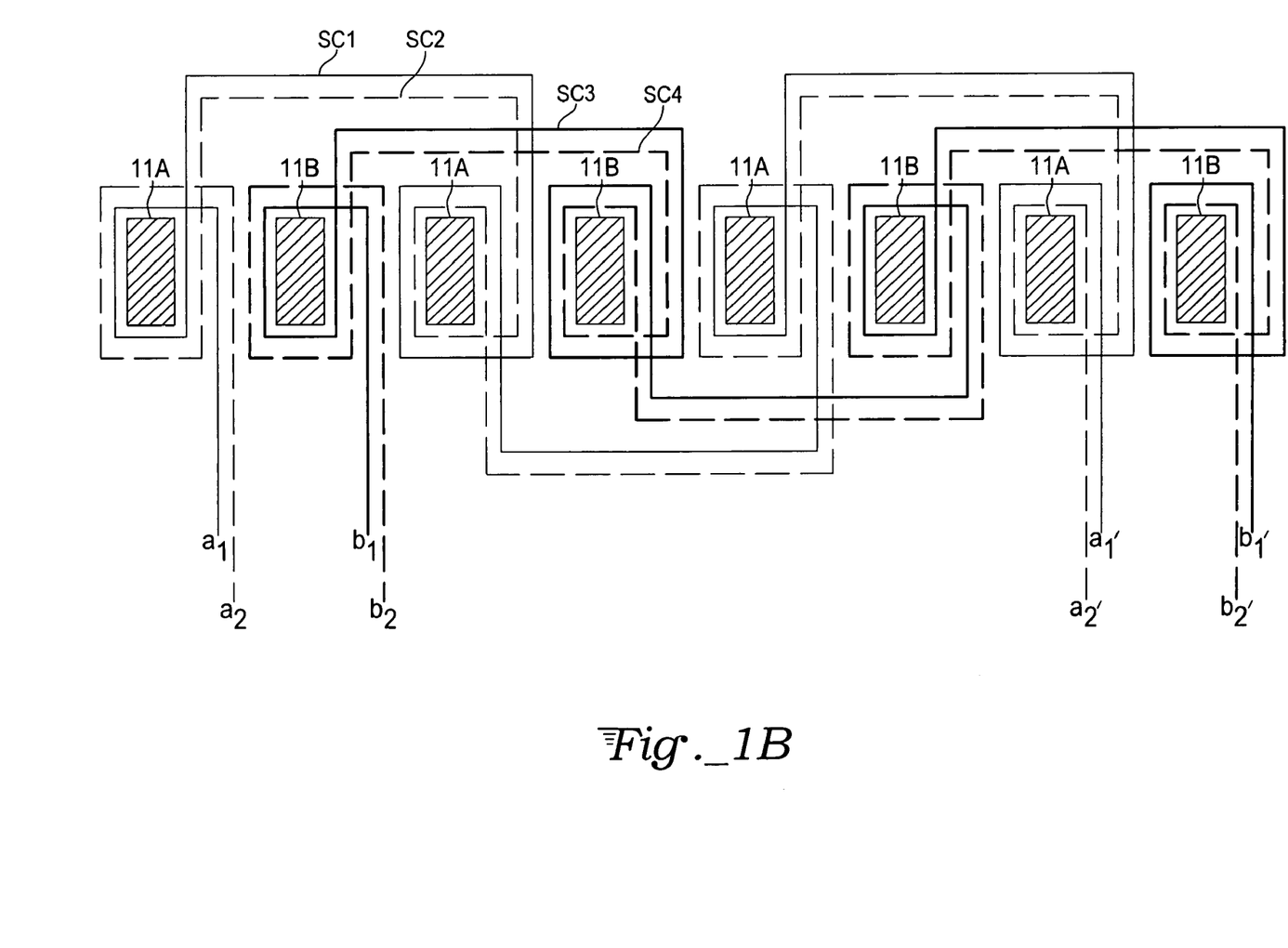
Figure 1C:
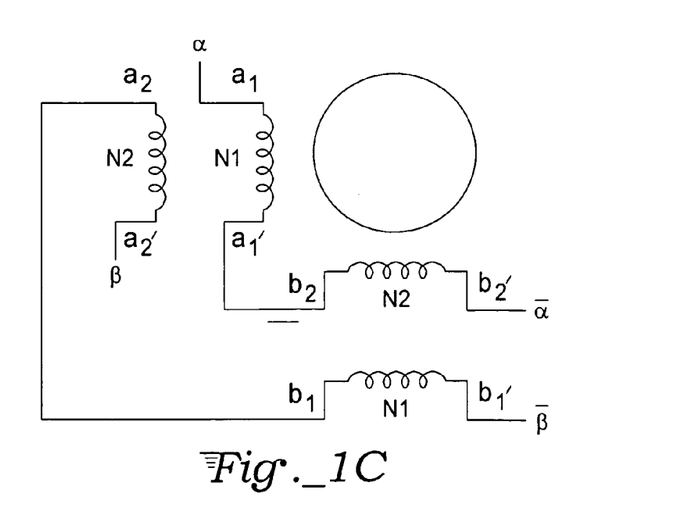

With reference to FIGS. 1A–1C, an exemplary eight-pole stator 15 of a two-phase bipolar stepping motor is seen. The motor also includes a rotor, which is not shown. Mechanically, the motor appears in actual implementation as a multi-tooth gear, and each of the stator poles 11 have a plurality of teeth 13 that mesh with corresponding teeth on the rotor to permit many motor steps per revolution. The step resolution is determined by multiplying the number of rotor teeth by the number of mechanical phases. In a bipolar device, the number of mechanical phases is twice the number of electrical phases. A wide variety of mechanical rotor/stator arrangements known in the stepper motor art can be used. The present invention is generally directed to improvements in the stator windings and corresponding connections of such windings to a two-phase driver for the stepper motor.

The stator 15 has eight stator poles 11. More generally, the stator can have 4·n stator poles, where n is a positive integer. Typically, $1 \leq n \leq 4$, so the number of stator poles may be 4, 8, 12 or 16. Four stator coils SC1, SC2, SC3 and SC4 are wound around the stator poles 11 in a bifilar winding pattern. That is, the stator coils are wound around the poles in pairs. The first and second stator coils SC1 and SC2 form a pair that is wound around a first group 11A of every other stator pole in alternating clockwise and counterclockwise directions around each successive pole in that group. Likewise, the third and fourth stator coils SC3 and SC4 form another pair that is wound around a second group 11B of every other stator pole, different from the first group 11A, again in alternating clockwise and counterclockwise directions. The ends of the stator coil wires are designated as a1 and a1' for SC1, a2 and a2' for SC2, b1 and b1' for SC3, and b2 and b2' for SC4.

For simplicity, the coils are shown in FIGS. 1A and 1B with only a single turn in order to illustrate the alternating winding directions around the poles in each group. It is well known, however, that each of the coils actually has a plurality of turns per stator pole. Moreover, in the present invention, as represented in FIG. 1C, the paired stator coils have different numbers of turns per pole, with first coils SC1 and SC3 in each pair having N1 turns per pole and with second coils SC2 and SC4 in each pair having N2 turns per pole. The selection of the specific ratio N2/N1 in order to produce a desired angular shift in torque profile is a characteristic feature of this invention. Thus, the basic physical representation of the stator in FIG. 1A should be understood as actually having plural turns per coil per stator pole, with the specified ratio of turns N2/N1 between paired coils SC2 and SC1, and likewise between paired coils SC4 and SC3.

The eight ends a1, a1', a2, a2', b1, b1', b2 and b2' of the four stator coils SC1, SC2, SC3 and SC4 are connected to a two-phase driver that provides two sets of pulses in respective phases, here designated α and β, that are 90° out of phase relative to each other, so as to drive the rotor in steps. As seen in FIG. 1C, a preferred connection is the one taught in this inventor's prior U.S. Pat. No. 6,597,077. In particular, the first and fourth stator coils SC1 and SC4 are connected together in series to a phase α of the driver. This is connection between a coil SC1 wrapped with N1 turns per pole around the first group 11A of poles and another coil SC4 wrapped with N2 turns per pole around the second group 11B of poles. Wire end a1' of first coil SC1 is connected to wire end b2 of fourth coil SC4, such that current provided by the driver proceeds in both coils in the same sense around the poles of the stator. Wire ends a1 and b2' are coupled to the driver. Likewise, the second and third stator coils SC2 and SC3 are connected together in series to a phase β of the driver, which is shifted 90° relative to phase α. Thus, this connection is between a coil SC2 wrapped with N2 turns per pole around the first group 11A of poles and a coil SC3 wrapped with N1 turns per pole around the second group 11B of poles. Wire end a2 of second coil SC2 is connected to wire end b1 of third coil SC3, such that current provided by the driver proceeds in these coils in opposite senses around the poles of the stator. Wire ends a2' and b1' are coupled to the driver. Hence, each connected set of coils includes a coil with N1 turns per pole and another coil with N2 turns per pole. Each connected set of coils also wraps around both groups of poles.

The phases α and β of the two-phase driver comprise DC pulses. The sequence of phase states in a pulse cycle when the motor is stepped continually, known as half-stepping, is:

| Time | Alpha | Beta |
|---|---|---|
| 0 | α(+), $\bar{\alpha}$(−) | 0 |
| T/8 | α(+), $\bar{\alpha}$(−) | β(+), $\bar{\beta}$(−) |
| T/4 | 0 | β(+), $\bar{\beta}$(−) |
| 3T/8 | α(−), $\bar{\alpha}$(+) | β(+), $\bar{\beta}$(−) |
| T/2 | α(−), $\bar{\alpha}$(+) | 0 |
| 5T/8 | α(−), $\bar{\alpha}$(+) | β(−), $\bar{\beta}$(+) |
| 3T/4 | 0 | β(−), $\bar{\beta}$(+) |
| 7T/8 | α(+), $\bar{\alpha}$(−) | β(−), $\bar{\beta}$(+) |
| T | same as t = 0 | same as t = 0 |

Here, forward current flows from α(+) to $\bar{\alpha}$(−) through coils SC1 and SC4 during one part of the cycle (e.g., at t=7T/8, 0, T/8), while reverse current flows from $\bar{\alpha}$(+) to $^1$α(−) through these same coils during another part of the cycle (e.g., at t=3T/8, T/2, 5T/8). Likewise, current flows through the coils SC2 and SC4 from plus (+) to minus (−) between the terminals β and $\bar{\beta}$ at various parts of the cycle (e.g., from β to $\bar{\beta}$ at t=T/8, T/4, 3T/8, but from to $\bar{\beta}$ at t=5T/8, 3T/4, 7T/8). There are times when both drive phases (αβ) are on, but other times (e.g., t=0, T/4, T/2, 3T/4) when only one drive phase (α or β) is on. One effect of the present invention is to equalize the holding torque for the α, αβ, and β drive phases.

Figure 2A:
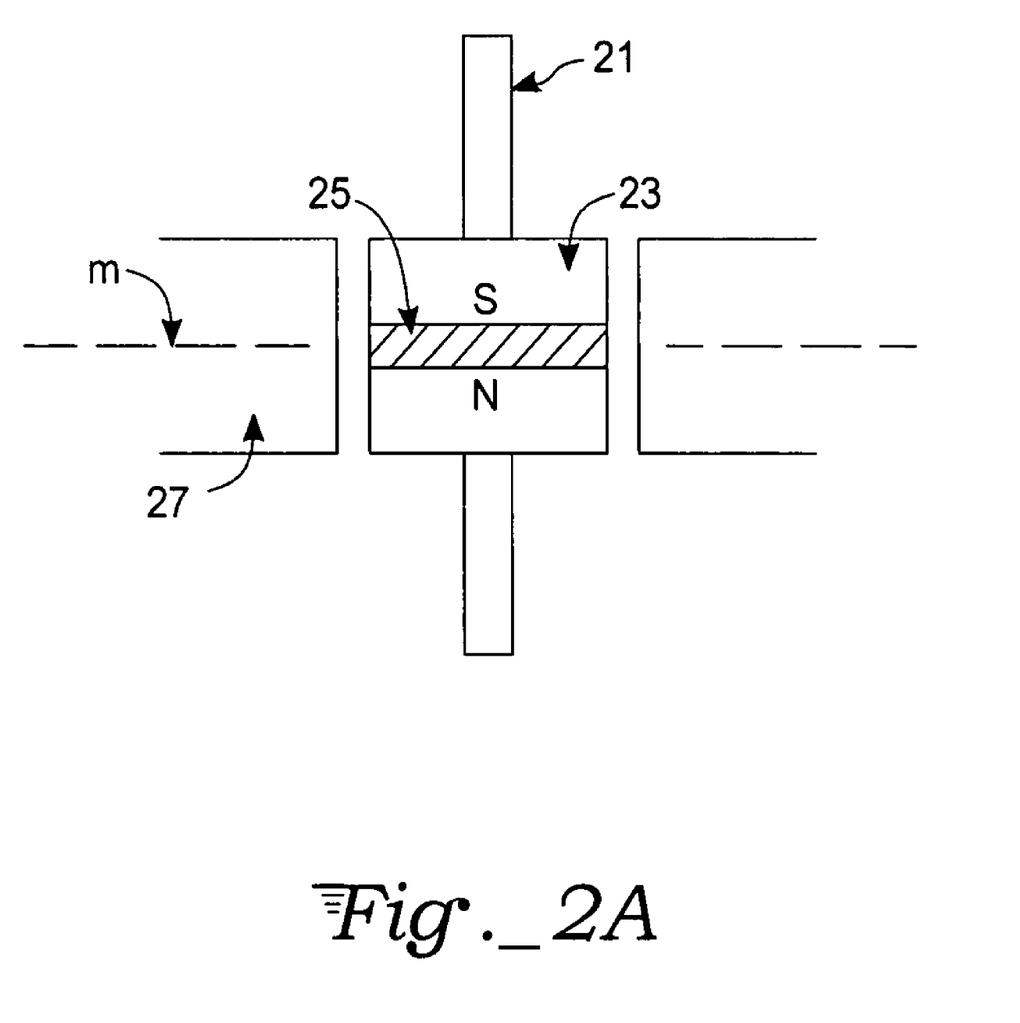
Figure 2B:
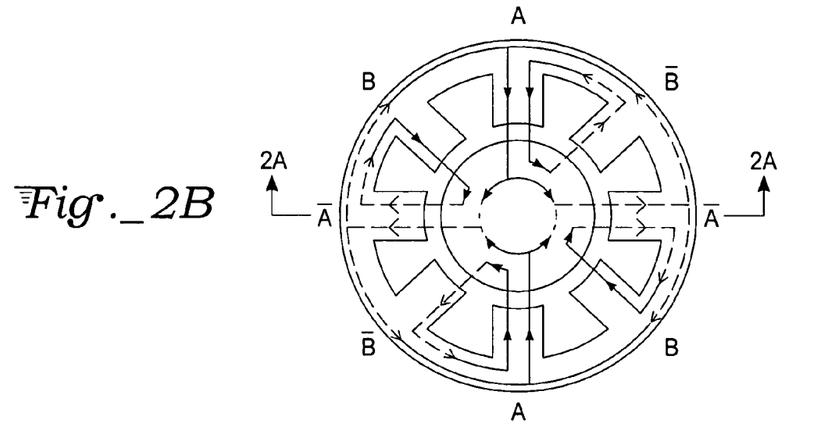
FIGS. 2B–2D are top plan views of the stator for the various states.
Figure 2C:
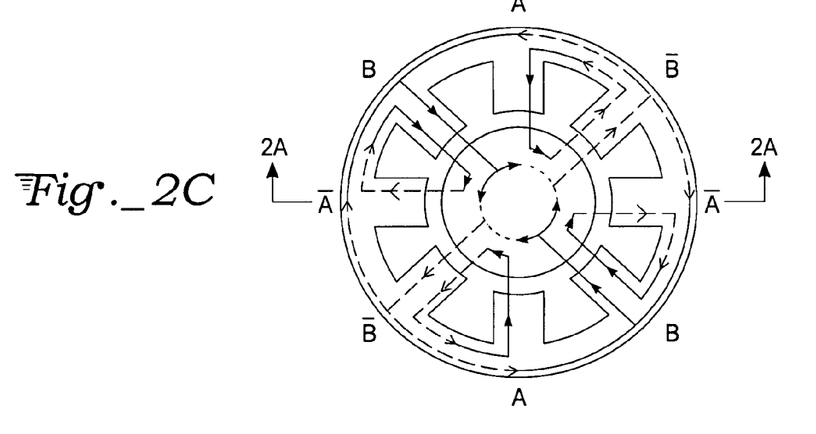
Figure 2D:
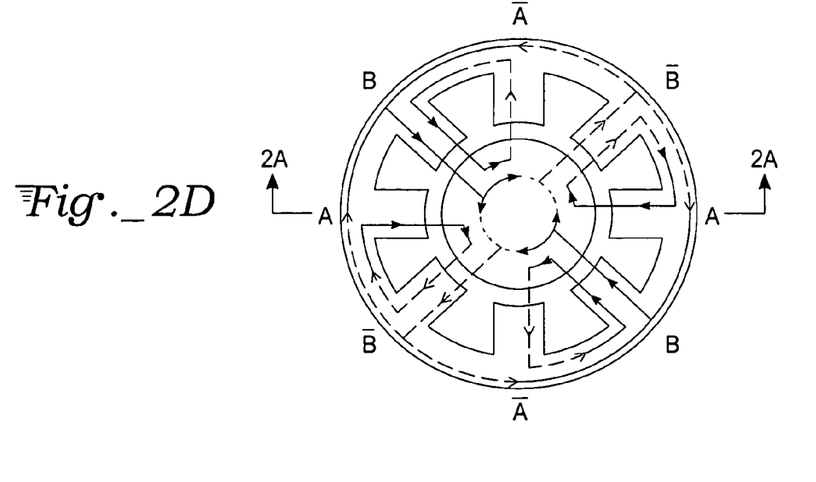

With reference to FIGS. 2A–2D, the unique magnetic flux paths and strengths for the present stepper motor with its N2/N1 turn ratio in the bifilar pairs of stator coils, together with the connection of coils that wind around different groups of poles, reduce motor noise and vibration. The side view in FIG. 2A shows an exemplary rotor 23 mounted on a motor shaft 21. A centrally located permanent magnet 25 is sandwiched between upper and lower sections of the rotor 23. In this view, the north and south magnetic poles of the magnet 25 are aligned with the rotor axis defined by the motor shaft 21, with the magnet 25 generally located in a central plane (seen as a middle line m through the rotor 23 and stator 27). The top views in FIGS. 2B–2D show the magnetic flux paths for three states of drive phases α and β, namely: α on, αβ both on, and β on. Magnetic flux traveling above the plane seen as middle line m in FIG. 2A are shown as solid lines in FIGS. 2B–2D, while magnetic flux traveling below that middle plane are shown as dashed lines in FIGS. 2B–2D. Note that even when both phases α and β are on and current flows in opposite directions through coils that are wound around the same stator poles, magnetic flux still passes around such poles, with flux above and below the middle plane m passing in opposite directions, and magnetic flux through the poles themselves are not completely neutralized by the opposed current flows because of the different numbers of turns of the stator coils. The α on phase seen in FIG. 2B has magnetic flux of 0.7071N·I through the A group poles and 0.2929N·I through the B group of poles. This occurs at time t=0 and at time t=T/2 (but with the flux directions reversed). The β on phase seen in FIG. 2D likewise has magnetic flux of 0.7071N·I through the B group of poles and a flux of −0.2929N·I through the A group of poles. This occurs at time t=T/4 and, with flux directions reversed, at time t=3T/4. The αβ both on phase seen in FIG. 2C (at times t=T/8, 3T/8, 5T/8 and 7T/8) has magnetic flux which is the sum of the α only and β only phases.

Figure 3:
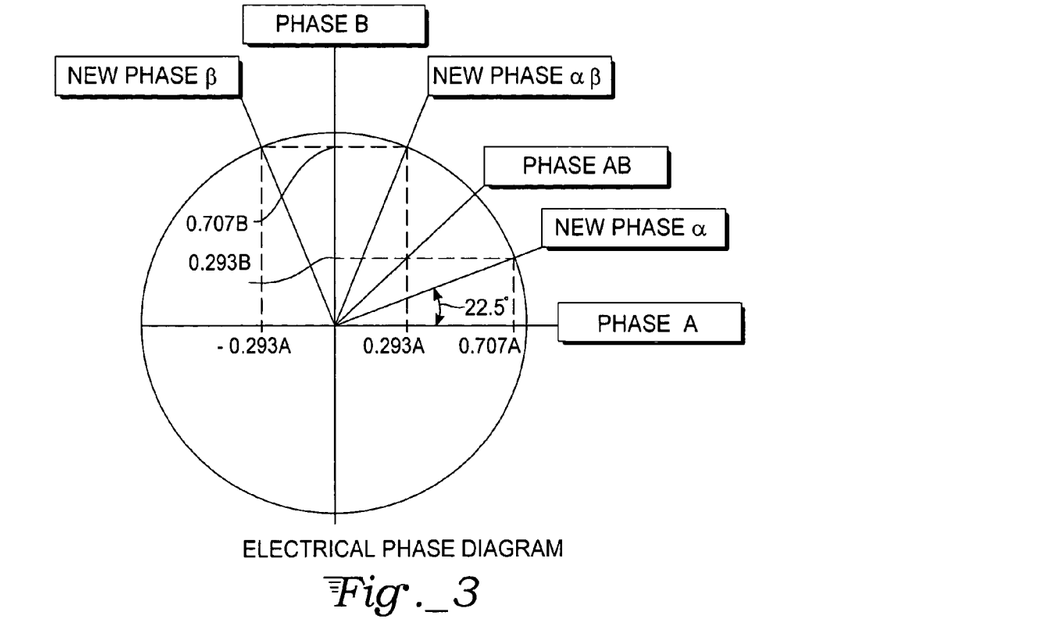
FIG. 3 is an electrical phase diagram and FIG. 4 is a graph of torque versus phase angle, both illustrating the angular shift in torque profile for the stepper motor of the present invention.
Figure 4:
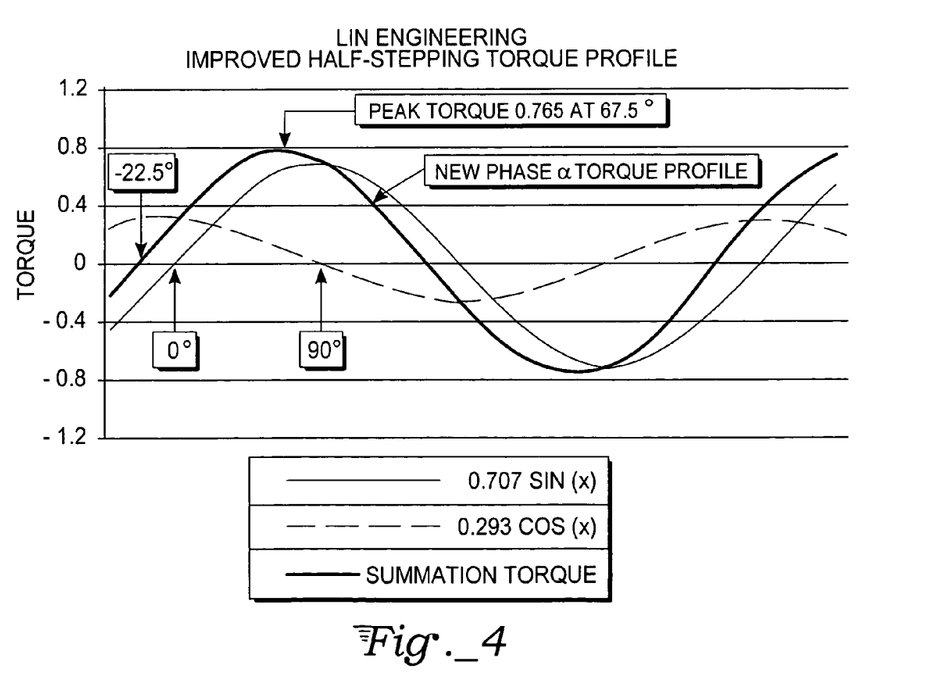

With reference to FIGS. 3 and 4, the effect of adding the flux contributions of winding layers with different numbers of turns per stator pole is illustrated. The addition of two sinusoidal waveforms of the same frequency but in quadrature phase relation and with different amplitudes results in another sinusoidal waveform of generally larger amplitude than and phase shifted from both component waveforms. The amount of the phase shift depends upon the relative amplitudes of the components. In particular, the shift equals the arctangent of the ratio between the two component amplitudes. The new amplitude is equal to the square root of the sum of the squares of the two amplitudes. In the example given in FIGS. 3 and 4, quadrature sinusoidal components with amplitudes of 0.293 and 0.707 combine to produce a phase shift of $\tan^{-1}(0.293/0.707)=22.5°$ and a new amplitude of $(0.293^2+0.707^2)^{1/2}=0.765$ for the new sinusoidal waveform. In the present invention, two distinct groups of interleaved stator poles are driven (FIG. 1C) by quadrature drive signals α and β, such that a first layer of stator coils of N1 turns per stator pole (first amplitude) drives one group a1 to a1' then (90° later) the other group b1 to b1', while a second layer of stator coils of N2 turns per stator pole (second amplitude) drives the second group b2 to b2' then (90° later) the first group a2' to a2. The resulting magnetic flux for each new drive phase α, αβ and β, is equivalent to the phase shifted drive with peak torque between the former step positions.

Torque and Induction Issues

Assuming each stator pole has a total N turns of coil, the first layer (stator coils SC1 and SC3) has N1 turns, and the second layer (stator coils SC2 and SC4) has N2 turns. Then, N=(N1+N2). The maximum holding torque of original phase A is $T_A$ and equals phase B, $T_B$ with 90° phase angle shifted. The maximum holding torque of new phase α is $T_\alpha$ equals new phase β, $T_\beta$ with 90° phase angle shifted. Assume the phase current is the same. The number of turns represents the maximum holding torque. Assume that there are 8 stator poles separated by 45° and the desired phase shift is exactly half that, i.e., 22.5°. In order to have new phase α shifted 22.5°, N2/N1 has to equal tan (22.5°)= 0.4142, i.e. N1= 0.7071N and N2=0.2929N.

$T_A = N \sin(\theta);$ $T_B = N \sin(90°+\theta) = N \cos(\theta);$ $T_{AB}$(max. at $\theta=45°$)$=N \sin(45°)+N \cos(45°)=1.4142N$ $T_\alpha = N1 \sin(\theta)+N2 \sin(90°+\theta)=N1 \sin(\theta)+N2 \cos(\theta)$ $T_\alpha$(max. at $\theta=67.5°$)$=N1 \sin(67.5°)+N2 \cos(67.5°)=$
   $0.9239N1+0.3827N2=0.6533N+0.1121N=$
   $0.7654N$ $T_\beta = T_\alpha = 0.7654N$ $T_{\alpha\beta}$(max. at $\theta=45°$)$=1.4142\times(0.7654N)=1.0824N$ Therefore, the maximum holding torque with conventional winding is 30.7% (=1.4142N/1.0824N) more than the one with new invention.

$La = N^2$ $L_\alpha = (N1^2 + N2^2)$

The new $L\alpha$ has only 58.6% [=$(N1^2+N2^2)/N^2$] of the inductance La. In order to keep the same holding torque and inductance as conventional windings, we need to proportionally increase the total number of turns by a factor $1/(0.5858)^{1/2}=1.3066$. Therefore, if we increase the total number turns by 30.7%, the new holding torque and inductance will be the same as conventional winding.

What is claimed is:

1. A half-stepping motor of the type having a rotor interacting magnetically with poles of a stator wound with stator coils driven by two-phase driver, the winding of the stator coils about the poles of the stator comprising:

a first layer of stator coils characterized by a first number N1 of turns per stator pole and a second layer of stator coils characterized by a second number N2 of turns per stator pole, each layer having at least two stator coils wound about distinct groups of interleaved stator poles, a first layer of stator coils wound about a first group of poles being connected to a second layer of stator coils wound about a second group of poles and to a first phase of the driver, a first layer of stator coils wound about a second group of poles being connected to a second layer of stator coils wound about a first group of poles and to a second phase of the driver in quadrature relation to the first phase, with a turn ratio N2/N1, not equal to one, between the number of turns in the two layers of stator coils having been selected to provide a desired angular phase shift in torque profile of arctan (N2/N1).

2. The half-stepping motor as in claim 1, wherein the number of stator poles is 8, the desired angular phase shift is 22.5°, and the turn ratio N2/N1 is substantially equal to 0.4142.

3. The half-stepping motor as in claim 1, wherein stator coils in each layer are wound in alternating clockwise and counterclockwise directions about the successive poles in a group.

4. The half-stepping motor as in claim 1, wherein stator coils wound about a group of poles are wound in the same direction for all layers.

5. The half-stepping motor as in claim 1, wherein each stator pole has a total number of turns $N=N1+N2$ that is selected to provide a specified inductance and holding torque.

6. A half-stepping motor of the type having a rotor with a permanent magnet sandwiched between two rotor sections and having a stator with 4·n stator poles, n being a positive integer, and four stator coils wound around the stator poles in a bifilar winding pattern, with first and second stator coils wound as a pair around a first group of every other stator pole in alternating clockwise and counterclockwise directions around each successive pole in that first group, and with third and fourth stator coils wound as a pair around a second group of every other stator pole, different from the first group, in alternating clockwise and counterclockwise directions around each successive pole in that second group, a two-phase driver connecting to the eight ends of the four stator coils and providing two sets of pulses in respective phases α and β that are 90° out of phase relative to each other so as to drive the rotor in steps, the first and fourth stator coils being connected together in series to phase α of the driver such that current proceeds in both coils in the same sense around the poles of the stators, and the second and third stator coils being connected together in series to phase β of the driver such that current proceeds in these coils in opposite senses around the poles of the stator, wherein the improvement is characterized in that:

the first and third stator coils have a first number N1 of turns per stator pole, the second and fourth stator coils have a second number N2 of turns per stator pole, and the ratio N2/N1 is selected to substantially equal tan x, where x is a desired angular shift in torque profile relative to each half-stepping position of the rotor.

7. The half-stepping motor as in claim 6, wherein the desired angular shift x in torque profile is 22.5°, and the ratio N2/N1 is substantially equal to tan 22.5°≈0.4142.

8. The half-stepping motor as in claim 6, wherein each stator pole has a total number of turns $N=N1+N2$ that is selected to provide a specified inductance and holding torque.

9. A method of driving a half-stepping motor of the type having a rotor interacting magnetically with poles of a stator wound with stator coils by means of a two-phase driver, the method comprising:

driving a first set of stator coils with current provided from the two-phase driver in a first phase α, the first set of stator coils being a first layer of coils wound around a first group of stator poles in series in a forward sense with a second layer of coils wound around a second group of stator poles, distinct from the first group; and driving a second set of stator coils with current provided from the two-phase driver in a second phase β, the second set of stator coils being a second layer of coils wound around the first group of stator poles connected in series in a reverse sense with a first layer of coils wound around the second group of stator poles, wherein the first and second phases α and β of the driver are in quadrature relation, and wherein the first layer of coils in each set has a first number N1 of turns per stator pole, the second layer of coils in each set has a second number N2 of turns per stator pole, different from said first number N1, and a turn ratio N2/N1 between the two layers of coils has been selected to provide a desired angular phase shift in torque profile of the magnetic interaction between rotor and stator.

10. The half-stepping motor as in claim 9, wherein the number of stator poles is 8, the desired angular phase shift is 22.5°, and the turn ratio N2/N1 is substantially equal to 0.4142.

11. The half-stepping motor as in claim 9, wherein each stator pole has a total number of turns $N=N1+N2$ that is selected to provide a specified inductance and holding torque.

* * * * *

UNITED STATES PATENT AND TRADEMARK OFFICE
CERTIFICATE OF CORRECTION

PATENT NO.          : 6,969,930 B2                                           Page 1 of 1
APPLICATION NO.  : 10/902192
DATED                  : November 29, 2005
INVENTOR(S)         : Ted T. Lin and Ryan C. Lin

It is certified that error appears in the above-identified patent and that said Letters Patent is hereby corrected as shown below:

Column 4, line 57 reads "... 3T/8, but from to $\vec{\beta}$ at t = 5T/8...."

should read --... 3T/8, but from $\vec{\beta}$ to β at t = 5T/8...--.

Signed and Sealed this

Fifth Day of May, 2009

JOHN DOLL
*Acting Director of the United States Patent and Trademark Office*